United States Patent
Yang et al.

(10) Patent No.: US 11,284,282 B2
(45) Date of Patent: Mar. 22, 2022

(54) BEAM MEASUREMENT METHOD, TERMINAL AND NETWORK DEVICE

(71) Applicant: GUANGDONG OPPO MOBILE TELECOMMUNICATIONS CORP., LTD., Guangdong (CN)

(72) Inventors: Ning Yang, Dongguan (CN); Hua Xu, Ottawa (CA); Hai Tang, Dongguan (CN); YaNan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/332,323

(22) PCT Filed: Nov. 4, 2016

(86) PCT No.: PCT/CN2016/104779
§ 371 (c)(1),
(2) Date: Mar. 11, 2019

(87) PCT Pub. No.: WO2018/082064
PCT Pub. Date: May 11, 2018

(65) Prior Publication Data
US 2019/0223038 A1 Jul. 18, 2019

(51) Int. Cl.
*H04W 24/10* (2009.01)
*H04B 17/318* (2015.01)
(Continued)

(52) U.S. Cl.
CPC .......... *H04W 24/10* (2013.01); *H04B 7/0617* (2013.01); *H04B 7/0619* (2013.01);
(Continued)

(58) Field of Classification Search
None
See application file for complete search history.

(56) References Cited

U.S. PATENT DOCUMENTS 9,094,977 B2   7/2015   Li et al.
9,191,957 B2   11/2015  Kim
(Continued)

FOREIGN PATENT DOCUMENTS

CN   101006683 A   7/2007
CN   102835147 A   12/2012
(Continued)

OTHER PUBLICATIONS

International Search Report in international application No. PCT/CN2016/104779, dated Aug. 8, 2017.
(Continued)

*Primary Examiner* — Otis L Thompson, Jr.
(74) *Attorney, Agent, or Firm* — Ladas & Parry LLP

(57) ABSTRACT

Disclosed are a beam measurement method, a terminal and a network device. The method comprises: a terminal receiving measurement configuration information sent by a network device, wherein the measurement configuration information is used for indicating a parameter used when measuring at least one beam; the terminal measuring the at least one beam according to the measurement configuration information to obtain a measurement result; and the terminal sending the measurement result to the network device. By means of the beam measurement method in the present application, a terminal receives measurement configuration information sent by a network device and measures a beam according to the measurement configuration information to obtain a more accurate measurement result based on the beam, so that it is beneficial for the network device to configure the terminal more efficiently according to the measurement result.

16 Claims, 4 Drawing Sheets

(51) Int. Cl.
  *H04B 7/06* (2006.01)
  *H04W 72/08* (2009.01)
  *H04W 72/04* (2009.01)
  *H04B 7/0413* (2017.01)
  *H04W 16/28* (2009.01)

(52) U.S. Cl.
  CPC ......... *H04B 7/0695* (2013.01); *H04B 17/318* (2015.01); *H04W 72/046* (2013.01); *H04W 72/085* (2013.01); *H04B 7/0413* (2013.01); *H04B 7/063* (2013.01); *H04W 16/28* (2013.01)

(56) References Cited

U.S. PATENT DOCUMENTS

| | | | |
|---|---|---|---|
| 9,326,188 | B1 | 4/2016 | Oroskar et al. |
| 2006/0034236 | A1 | 2/2006 | Jeong |
| 2007/0232359 | A1 | 10/2007 | Pinheiro |
| 2013/0059619 | A1 | 3/2013 | Kim |
| 2013/0121185 | A1 | 5/2013 | Li et al. |
| 2013/0155847 | A1 | 6/2013 | Li et al. |
| 2015/0085754 | A1 | 3/2015 | Su et al. |
| 2016/0073393 | A1 | 3/2016 | Kim et al. |
| 2016/0127919 | A1 | 5/2016 | Hui et al. |
| 2016/0150435 | A1* | 5/2016 | Baek ............... H04W 24/10 370/252 |
| 2016/0262077 | A1 | 9/2016 | Zhang et al. |
| 2016/0337881 | A1 | 11/2016 | Zhang et al. |
| 2017/0195027 | A1 | 7/2017 | Baek et al. |
| 2017/0207841 | A1 | 7/2017 | Kim et al. |
| 2017/0207845 | A1* | 7/2017 | Moon ............... H04B 7/0695 |
| 2017/0251518 | A1* | 8/2017 | Agiwal ............. H04W 76/28 |
| 2018/0069606 | A1* | 3/2018 | Jung ................ H04W 48/20 |
| 2019/0222293 | A1* | 7/2019 | Lee ................. H04W 72/046 |
| 2020/0028599 | A1* | 1/2020 | Zhang ............... H04B 7/08 |
| 2020/0186312 | A1* | 6/2020 | Mochizuki ........ H04W 72/0413 |
| 2021/0144573 | A1* | 5/2021 | Yoon ................ H04B 7/0632 |

FOREIGN PATENT DOCUMENTS

| | | |
|---|---|---|
| CN | 103220704 A | 7/2013 |
| CN | 103765794 A | 4/2014 |
| CN | 104350689 A | 2/2015 |
| CN | 104737465 A | 6/2015 |
| CN | 105340324 A | 2/2016 |
| CN | 105684547 A | 6/2016 |
| CN | 105790886 A | 7/2016 |
| CN | 106301505 A | 1/2017 |
| CN | 108566667 A | 9/2018 |
| EP | 3101971 A1 | 12/2016 |
| EP | 3506524 A1 | 7/2019 |
| EP | 3525359 A1 | 8/2019 |
| JP | 2017505583 A | 2/2017 |
| KR | 20140114888 A | 9/2014 |
| RU | 2595784 C2 | 8/2016 |
| WO | 2013133669 A1 | 9/2013 |
| WO | 2015109153 A1 | 7/2015 |
| WO | 2015113205 A1 | 8/2015 |
| WO | 2015191200 A1 | 12/2015 |
| WO | 2016013351 A1 | 1/2016 |
| WO | 2016085266 A1 | 6/2016 |
| WO | 2016172840 A1 | 11/2016 |
| WO | WO-2018029017 A1 * | 2/2018 ............. H04B 7/043 |

OTHER PUBLICATIONS

Written Opinion of the International Search Authority in international application No. PCT/CN2016/104779, dated Aug. 8, 2017.
Supplementary European Search Report in the European application No. 16920505.1, dated Jul. 4, 2019.
English translation of the Written Opinion of the International Search Authority in the international application No. PCT/CN2016/104779, dated Aug. 8, 2017.
Samsung, Discussion of NR IDLE mode operation, 3GPP TSG-RAN WG2 Meeting#95bis, R2-166388, Kaohsiung, Taiwan, Oct. 10-14, 2016, section 1-4.
First Office Action of Russian application No. 2019113383, dated Dec. 9, 2019.
First Office Action of Chilean application No. 201901162, dated Dec. 19, 2019.
First office Action of the Chinese application No. 201680089269.9, dated Mar. 16, 2020.
Second Office Action of the Chinese application No. 201650089269.9, dated Jun. 3, 2020.
First Office Action of the Canadian application No. 3038227, dated Apr. 29, 2020.
First Office Action of the Singapore application No. 11201902566V, dated Apr. 25, 2020.
Notice of Allowance of the Russian application No. 2019113383, dated Mar. 24, 2020.
Notice of Allowance to be issued of the Chilean application No. 201901162, dated Apr. 20, 2020.
First Office Action of the Indian application No. 201917014119, dated Oct. 5, 2020.
Yuefeng Peng, Study on Key Techniques in LTE-Advanced System, Jun. 1, 2013 (Jun. 1, 2013), entire document.
3GPP, Radio Frequency (RF) requirement background for, 3GPP TR 37.842 V2.1.0 (Sep. 2016), Sep. 13, 2016 (Sep. 13, 2016), entire document.
Notice of Allowance of the Chinese application No. 201680089269.9, dated Aug. 20, 2020.
First Office Action of the Brazilian application No. BR1120190077332, dated Sep. 8, 2020.
3GPP TSG-RAN WG2 #95bis, R2-167285, "Summary of RAN2#95bis offline discussions on NR Cell definition and relation to beams in Connected mode", Ericsson (Sep. 30, 2016), pp. 1-2.
3GPP TSG-RAN WG2 Meeting #95bis, R2-167157, "Evaluation of beam-based RRM Measurement", Samsung (Sep. 30, 2016), 6 pages.
First Office Action of the Japanese application No. 2019-513817, dated Nov. 27, 2020.
First Office Action of the Israeli application No. 265503, dated Nov. 12, 2020.
Second Office Action of the Canadian application No. 3038227, dated Feb. 9, 2021.
Office Action of the Taiwanese application No. 106137775, dated Feb. 26, 2021.
First Office Action of the European application No. 16920505.1, dated Mar. 11, 2021.
Decision of Refusal of the Japanese application No. 2019-513817, dated Mar. 30, 2021.
ZTE, ZTE Microelectronics, Consideration on the RRM Measurement for NR, 3GPP TSG, RAN WG2 #95bis R2-166337, Kaohsiung, Oct.10-14, 2016, 4 pages.
First Office Action of the Indonesian application No. P00201903710, dated Apr. 13, 2021.
Office Action of the Australian application No. 2016428464, dated Aug. 30, 2021.
First Office Action of the Chinese application No. 202011217163.7, dated Jan. 10, 2022.

* cited by examiner

BEAM MEASUREMENT METHOD, TERMINAL AND NETWORK DEVICE

RELATED APPLICATION

This application is an application under 35 U.S.C. 371 of International Application No. PCT/CN2016/104779 filed on Nov. 4, 2016, the entire contents of which are incorporated herein by reference.

TECHNICAL FIELD

The disclosure relates to the field of communications, and particularly to a beam measurement method, a terminal and a network device.

BACKGROUND

Along with the continuous development of wireless communication technology, requirements of a wireless communication system on coverage and wireless bandwidths for transmission have gradually increased and the wireless communication system may ensure coverage capabilities of networks through a beamforming technology.

The beamforming technology refers to an antenna array-based signal preprocessing technology that generates a directional beam by adjusting a weighting coefficient of each array element in an antenna array to obtain a significant array gain. In the beamforming technology, after a terminal accesses a cell, a network device to which the cell belongs allocates a beam suitable for data transmission of the terminal for the terminal.

However, in a related art, when a terminal in a connected state moves, the terminal is configured only on the basis of a measurement result of a cell, and thus it is unable to fully consider various factors during configuration.

SUMMARY

The disclosure provides a beam measurement method, a terminal and a network device, which may obtain a more accurate measurement result based on a beam and perform more efficient configuration for the terminal.

According to a first aspect, the disclosure provides a beam measurement method, which may include the following operations. A terminal receives measurement configuration information sent by a network device, and the measurement configuration information is configured to indicate a parameter used during measurement of at least one beam. The terminal measures the at least one beam to obtain a measurement result according to the measurement configuration information. The terminal sends the measurement result to the network device.

According to the beam measurement method of the first aspect, the terminal receives the measurement configuration information sent by the network device and measures the beam according to the measurement configuration information to obtain a more accurate beam-based measurement result, so that the network device performs more efficient configuration for the terminal according to the measurement result.

In combination with the first aspect, in a possible implementation mode of the first aspect, the method may further include the following operation. The terminal receives a determination result sent by the network device, and the determination result includes at least one of a target beam, a target beam group or a target cell determined by the network device according to the measurement result. The target beam is a beam on which the terminal is capable of camping, the target beam group is a beam group on which the terminal is capable of camping and the target cell is a cell on which the terminal is capable of camping.

In combination with the first aspect or any abovementioned possible implementation mode, in a possible implementation mode of the first aspect, the at least one beam belongs to the same cell. In the possible implementation mode, the network-side device selects the target beam on which the terminal may camp from multiple beams in the cell according to the measurement result of the at least one beam in the same cell, thereby improving quality of communication between the terminal and the network-side device.

In combination with the first aspect or any abovementioned possible implementation mode, in a possible implementation mode of the first aspect, the at least one beam includes multiple beams and the multiple beams belong to multiple cells. In the possible implementation mode, the network-side device selects the target beam on which the terminal may camp from multiple beams in the cells according to a measurement result of the at least one beam in the multiple cells, thereby improving the quality of communication between the terminal and the network-side device.

In combination with the first aspect or any abovementioned possible implementation mode, in a possible implementation mode of the first aspect, the measurement configuration information includes at least one of an indication of the beam, an indication of a beam group to which the beam belongs, an indication of a cell corresponding to the beam, an indication of an Access Point (AP) corresponding to the beam, an indication of a base station corresponding to the beam, a measurement frequency, a measurement cycle, a measurement duration, a measurement mode, a beam resource related parameter or information of a reference signal corresponding to the beam.

In combination with the first aspect or any abovementioned possible implementation mode, in a possible implementation mode of the first aspect, the method may further include the following operations. The terminal reports a measurement mode recommended after beam measurement to the network device. The terminal receives an updating configuration sent by the network device, and the updating configuration is configured to instruct the terminal to use an updated measurement mode for beam measurement. In the possible implementation mode, the new measurement mode is recommended to the serving network device through a feedback mechanism and the network device may configure a better measurement mode for the terminal, so that the terminal device may adopt the better measurement mode for measurement and measurement efficiency is improved.

In combination with the first aspect or any abovementioned possible implementation mode, in a possible implementation mode of the first aspect, the measurement configuration information may include information of the measurement mode, and the information of the measurement mode includes at least one of information of the measurement duration or information of the measurement cycle. The at least one beam belongs to one or multiple cells, the measurement duration is a duration corresponding to measurement of all beams in the one or multiple cells, and the measurement duration and the measurement cycle are determined by the network device according to a sweeping cycle of all beams in the one or multiple cells and/or a sweeping duration of all beams in the one or multiple cells. Alternatively, the at least one beam belongs to one or multiple cells, the measurement duration is a duration corresponding to measurement of one beam in the one or multiple cells, and the measurement duration and the measurement cycle are determined by the network device according to the sweeping cycle of each beam in the one or multiple cells and/or the sweeping duration of each beam in the one or multiple cells. Alternatively, the at least one beam includes multiple beams, the multiple beams belong to multiple cells, the measurement mode includes multiple measurement durations and/or multiple measurement cycles, and the measurement durations and the measurement cycles are determined by the network device according to a sweeping cycle of each beam of each cell in the multiple cells and/or a sweeping duration of each beam of each cell in the multiple cells.

In combination with the first aspect or any abovementioned possible implementation mode, in a possible implementation mode of the first aspect, the measurement result includes signal strength and/or signal quality for each of the at least one beam. Alternatively, the measurement result includes signal strength and/or signal quality for the beam group to which the beam belongs. Alternatively, the measurement result includes signal strength and/or signal quality for the cell containing the beam. Alternatively, the measurement result may include an ordering of the signal strength and/or signal quality of the at least one beam.

In combination with the first aspect or any abovementioned possible implementation mode, in a possible implementation mode of the first aspect, the measurement result includes an indication of a beam group or an indication of a cell with optimal signal strength and/or optimal signal quality for signal transmission in beam groups to which the beams belong or in cells corresponding to the beams. Alternatively, the measurement result includes average signal strength and/or average signal quality for signal transmission in the beam groups to which the beams belong or in the cells corresponding to the beams.

According to a second aspect, the disclosure provides a beam measurement method, which may include the following operations. A network device sends measurement configuration information to a terminal, the measurement configuration information being configured to indicate a parameter used during measurement of at least one beam. The network device receives a measurement result sent by the terminal, the measurement result being obtained by measuring the at least one beam according to the measurement configuration information.

In combination with the second aspect, in a possible implementation mode of the second aspect, the method may further include the following operation. The network device determines at least one of a target beam, a target beam group or a target cell according to the measurement result. The target beam is a beam on which the terminal is capable of camping, the target beam group is a beam group on which the terminal is capable of camping and the target cell is a cell on which the terminal is capable of camping. The network device sends a determination result to the terminal, the determination result including at least one of the target beam, the target beam group or the target cell.

In combination with the second aspect or any abovementioned possible implementation mode, in a possible implementation mode of the second aspect, the at least one beam belongs to the same cell.

In combination with the second aspect or any abovementioned possible implementation mode, in a possible implementation mode of the second aspect, the at least one beam includes multiple beams and the multiple beams belong to multiple cells.

In combination with the second aspect or any abovementioned possible implementation mode, in a possible implementation mode of the second aspect, the measurement configuration information may include at least one of an indication of the beam, an indication of a beam group to which the beam belongs, an indication of a cell corresponding to the beam, an indication of an AP corresponding to the beam, an indication of a base station corresponding to the beam, a measurement frequency, a measurement cycle, a measurement duration, a measurement mode, a beam resource related parameter or information of a reference signal corresponding to the beam.

In combination with the second aspect or any abovementioned possible implementation mode, in a possible implementation mode of the second aspect, the method may further include the following operations. The network device receives a measurement mode recommended after beam measurement and reported by the terminal. The network device sends an updating configuration to the terminal, and the updating configuration is configured to instruct the terminal to use an updated measurement mode for beam measurement.

In combination with the second aspect or any abovementioned possible implementation mode, in a possible implementation mode of the second aspect, the measurement configuration information may include information of the measurement mode, and the information of the measurement mode includes information of the measurement duration and/or information of the measurement cycle. The at least one beam belongs to one or multiple cells, the measurement duration is a duration corresponding to measurement of all beams in the one or multiple cells, and the measurement duration and the measurement cycle are determined by the network device according to a sweeping cycle of all beams in the one or multiple cells and/or a sweeping duration of all beams in the one or multiple cells. Alternatively, the at least one beam belongs to one or multiple cells, the measurement duration is a duration corresponding to measurement of one beam in the one or multiple cells, and the measurement duration and the measurement cycle are determined by the network device according to the sweeping cycle of each beam in the one or multiple cells and/or the sweeping duration of each beam in the one or multiple cells. Alternatively, the at least one beam includes multiple beams, the multiple beams belong to multiple cells, the measurement mode includes multiple measurement durations and/or multiple measurement cycles, and the measurement durations and the measurement cycles are determined by the network device according to a sweeping cycle of each beam of each cell in the multiple cells and/or a sweeping duration of each beam of each cell in the multiple cells.

In combination with the second aspect or any abovementioned possible implementation mode, in a possible implementation mode of the second aspect, the measurement result includes signal strength and/or signal quality for each beam in the at least one beam. Alternatively, the measurement result includes signal strength and/or signal quality for the beam group to which the beam belongs. Alternatively, the measurement result may include signal strength and/or signal quality for the cell containing the beam. Alternatively, the measurement result may include an ordering of the signal strength and/or signal quality of the at least one beam.

In combination with the second aspect or any abovementioned possible implementation mode, in a possible implementation mode of the second aspect, the measurement result may include an indication of a beam group or indication of a cell with optimal signal strength and/or optimal signal quality for signal transmission in the beam groups to which the beams belong or in the cells corresponding to the beams. Alternatively, the measurement result includes average signal strength and/or average signal quality for signal transmission in the beam groups to which the beams belong or in the cells corresponding to the beams.

According to a third aspect, the disclosure provides a terminal, which includes a receiving module, a processing module and a receiving module, configured to implement corresponding functions of the terminal in the abovementioned aspects. The function of each module may be realized through hardware and may also be realized by executing corresponding software through the hardware. The hardware or the software includes one or more modules corresponding to the functions.

According to a fourth aspect, the disclosure provides a terminal, which includes a processor, a transceiver and a memory, configured to implement corresponding functions of the terminal in the abovementioned aspects. The function of each device may be realized through hardware and may also be realized by executing corresponding software through the hardware.

According to a fifth aspect, the disclosure provides a network device, which includes a sending module and receiving module, configured to implement corresponding functions of the network device in the abovementioned aspects. The function of each module may be realized through hardware and may also be realized by executing corresponding software through the hardware. The hardware or the software includes one or more modules corresponding to the functions. The network device may further include a processing module, configured to realize functions in the corresponding implementation modes.

According to a sixth aspect, the disclosure provides a network device, which includes a processor, a transceiver and a memory, configured to realize corresponding functions of the terminal in the abovementioned aspects. The function of each device may be realized through hardware and may also be realized by executing corresponding software through the hardware.

According to a seventh aspect, the disclosure provides a computer-readable storage medium, which is configured to store a program code for a beam measurement method. The program code is configured to execute a method instruction in the first aspect.

According to an eighth aspect, the disclosure provides a computer-readable storage medium, which is configured to store a program code for a beam measurement method. The program code is configured to execute a method instruction in the second aspect.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS) sytem, a Long Term Evolution (LTE) system, a Wireless Local Area Network (WLAN) system, a Public Land Mobile Network (PLMN) system and a 5th-Generation (5G) New Radio (NR) system.

It is also to be understood that a terminal may also be called User Equipment (UE), may also be called a mobile terminal, a mobile device and the like and may communicate with one or more core networks through, for example, a Radio Access Network (RAN). The UE may be a mobile terminal, for example, a mobile phone (or called a "cellular" phone) and a computer with a mobile terminal function. For example, the terminal may also be a portable, pocket, handheld, computer-embedded or vehicle-mounted mobile device and performs language and/or data exchange with the RAN.

It is also to be understood that a network device may be a device configured to communicate with the terminal. The network device may be an AP in the WLAN system, a Base Transceiver Station (BTS) in the GSM or the CDMA system, may also be a NodeB (NB) in the WCDMA system, and may further be an Evolutional Node B (eNB or eNodeB) in the LTE system, or a relay station or AP, or a vehicle-mounted device, a wearable device, a network device in a future 5G network system, a network device in a future evolved PLMN system or the like.

In addition, a cell involved in the embodiments of the disclosure may refer to the concept of a cell in an existing cellular network and may also be the concept based on an AP, a transmission point or a base station. There are no limits made thereto in the embodiments of the disclosure.

For convenient comprehension, an application scenario of a beam measurement method according to the embodiments of the disclosure will be introduced at first.

Figure 1:
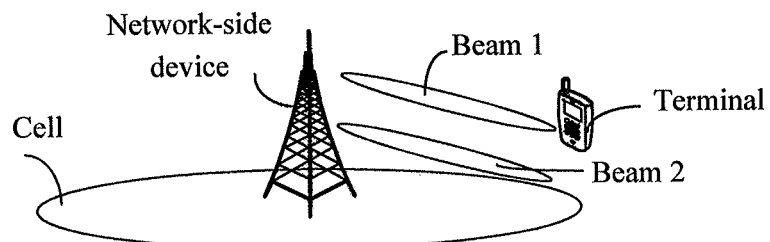
FIG. 1 is a schematic diagram of an application scenario of a beam measurement method according to an embodiment of the disclosure.

FIG. 1 is a schematic diagram of an application scenario of a beam measurement method according to an embodiment of the disclosure. From the application scenario illustrated in FIG. 1, it can be seen that in a cell, there may exist a beam (not illustrated in FIG. 1) configured for signaling transmission of a control channel and multiple beams (referring to beam 1 and beam 2 in FIG. 1) configured for data transmission of a data channel. That is, in the cell, the whole cell may be covered by a "wide beam" configured for signaling transmission of the control channel and the whole cell may be covered by multiple "narrow beams" configured for signaling transmission of the data channel.

Figure 2:
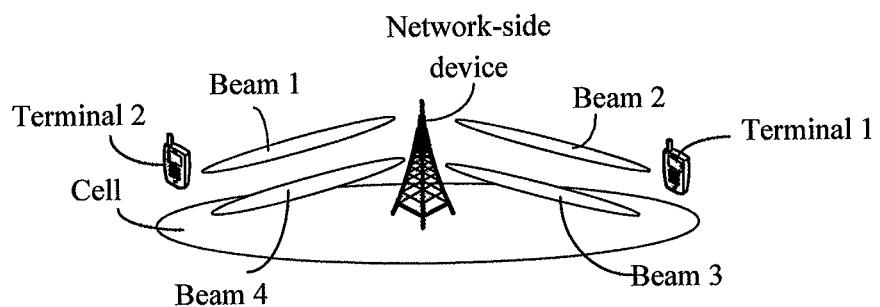
FIG. 2 is a schematic diagram of another application scenario of a beam measurement method according to an embodiment of the disclosure.

FIG. 2 is a schematic diagram of another application scenario of a beam measurement method according to an embodiment of the disclosure. From the application scenario illustrated in FIG. 2, it can be seen that in the cell, there may exist multiple "narrow beams" (referring to beam 1 and beam 2 in FIG. 2) configured for control signaling transmission of a control channel and there may also exist multiple "narrow beams" (referring to beam 3 and beam 4 in FIG. 2) configured for data transmission of a data channel. A terminal 1 may perform control signaling interaction with a network device through the beam 2, the terminal 1 may perform data transmission with the network device through the beam 3, a terminal 2 may perform control signaling interaction with the network device through the beam 1 and the terminal 2 may perform data transmission with the network device through the beam 4. That is, the terminals may perform signaling interaction with the network device through the "narrow beams" configured for control signaling transmission of the control channel. The terminals may also perform data transmission with the network device through the "narrow beams" configured for data transmission of the data channel. The beams configured for control signaling transmission of the control channel between the terminals and the network device and the beams configured for data transmission of the data channel between the terminal and the network device may be the same and may also be different. It is to be understood that FIG. 2 only illustrates the condition that the beams configured for control signaling transmission of the control channel between the terminals and the network device are different from the beams configured for data transmission of the data channel between the terminals and the network device as an example.

Figure 3:
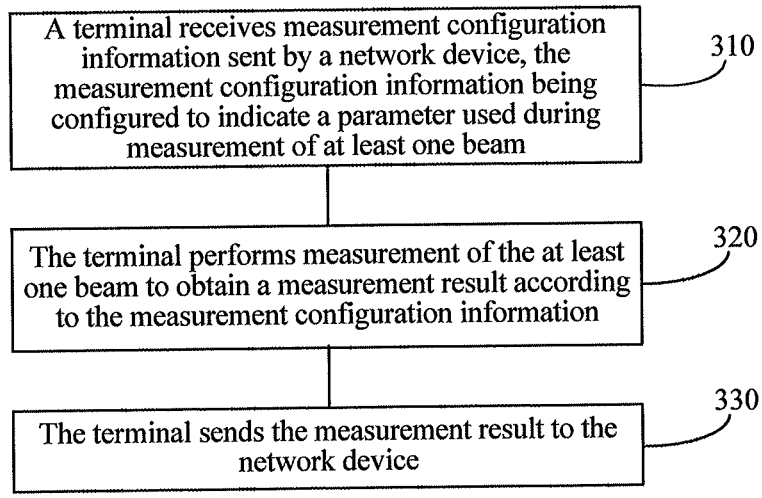
FIG. 3 is a schematic flowchart of a beam measurement method according to an embodiment of the disclosure.

It is to be noted that signal quality and/or signal strength for signal transmission between the terminal and the network device may be improved by use of a relatively high beamforming gain of a "narrow beam" relative to a "wide beam". FIG. 3 is a schematic flowchart of a beam measurement method 300 according to an embodiment of the disclosure. The method 300 is executed by a terminal. It is to be understood that the terminal may be a terminal in a connected state, that is, a Non-Access Stratum (NAS) or Access Stratum (AS) signaling connection is established between the terminal and a network-side device. The method 300 may include the following operations.

In S310, the terminal receives measurement configuration information sent by a network device, the measurement configuration information being configured to indicate a parameter used during measurement of at least one beam.

Specifically, the measurement configuration information may include at least one of an indication of the beam (e.g., a beam index), an indication of a beam group to which the beam belongs, an indication of a cell corresponding to the beam, an indication of an AP corresponding to the beam, an indication of a base station corresponding to the beam, a measurement frequency, a measurement cycle, a measurement duration, a measurement mode, a beam resource related parameter or information of a reference signal corresponding to the beam.

The information of the reference signal corresponding to the beam may include a non-UE specific reference signal corresponding to the beam (e.g., Single-Sideband modulation (SSB) signal and/or a UE specific reference signal corresponding to the beam (e.g., Channel Signal Information Reference Signal (CSI-RS).

The information in the measurement configuration information may be related to the beam, for example, the indication of the beam, the indication of the beam group, the beam resource related parameter (for example, time-frequency resources or antenna port for sending the beam), the non-UE specific reference signal corresponding to the beam and the UE specific reference signal corresponding to the beam. The information in the measurement configuration information may also be unrelated to the beam, for example, the indication of the cell, the indication of the AP, the indication of the base station, the measurement frequency, the measurement cycle, the measurement duration and the measurement mode.

It is to be understood that the beam, the beam group, the cell, the AP and the base station are based on different levels. For example, the measurement configuration information may be a parameter applicable to one or multiple beams, and then the indication in the measurement configuration information may be an indication/indications of the one or multiple beams. For another example, the measurement configuration information may be a parameter applicable to all beams in one or multiple cells, and then the indication in the measurement configuration information may be an indication/indications of the one or multiple cells. Similarly, the measurement configuration information may be for a beam group (for example, beams in a cell may be divided into one or multiple beam groups), AP or base station, and correspondingly, the indication in the measurement configuration information may be an indication/indications of the one or multiple beam groups, an indication/indications of one or more APs, an indication/indications of one or more base stations, and the like. There are no limits made thereto in the embodiment of the disclosure.

All of the information, listed above, in the measurement configuration information is optional and part of information may be specified through a protocol or exchanged through other signaling. For example, when the measurement configuration information may be applied to multiple beams, since a measurement duration is related to a sweeping duration of a beam, a measurement duration of each beam in a system may be the same, the measurement duration may be specified in the protocol or set to be a default value and the measurement configuration information may include no measurement duration. For another example, the measurement mode may include the measurement duration and/or the measurement cycle, and then the measurement configuration information may include no measurement duration and/or no measurement cycle. For another example, the measurement frequency forms a certain mathematical relationship with the measurement cycle, and then the measurement configuration information may only include one of the measurement frequency and the measurement cycle. The information in the measurement configuration information will not be elaborated one by one herein.

It is to be understood that the information in the measurement configuration information may be the information per se and may also be indexes, serial numbers (e.g., a bitmap) or the like available for indicating the information contents. There are no limits made thereto in the embodiment of the disclosure.

In S320, the terminal performs measurement of the at least one beam to obtain a measurement result according to the measurement configuration information.

Specifically, the at least one beam may be a beam configured for signaling transmission of a control channel and/or a beam configured for data transmission of a data channel. The beam configured for signaling transmission of the control channel and the beam configured for data transmission of the data channel may be the same beam. The beam configured for signaling transmission of the control channel and the beam configured for data transmission of the data channel may also be different beams.

For example, the measurement configuration information is a parameter applied to one or multiple beams. The at least one beam may correspond to one measurement configuration information. For example, the at least one beam measured by the terminal may include a beam 1, a beam 2 and a beam 3. The beam 1, the beam 2 and the beam 3 may correspond to a measurement configuration information, that is, the measurement configuration information may include a beam indication of the beam 1, a beam indication of the beam 2 and a beam indication of the beam 3. When the measurement configuration information is at least one measurement configuration information, the at least one beam may form a one-to-one correspondence with the at least one measurement configuration information, that is, each measurement configuration information may include a beam indication of a beam to be measured. The condition that the measurement configuration information is applied to one or multiple cells, beam groups, base stations or APs is similar to the condition that the measurement configuration information is applied to one or multiple beams, which will not be elaborated herein.

In at least one embodiment, the at least one beam may belong to the same cell. For example, when the at least one beam includes multiple beams, the multiple beams may form a beam group, and the beams of the beam group may be beams of a cell or part of beams of the same cell.

In at least one embodiment, the at least one beam may also belong to different cells respectively. For example, when the at least one beam includes multiple beams, part of beams in the at least one beam may belong to the same cell (for example, a first cell) and the beams, except the beams belonging to the first cell, in the at least one beam may belong to another cell (for example, a second cell). The first cell may be an adjacent cell of the second cell.

In the embodiment of the disclosure, when the at least one beam belongs to different cells, particularly belongs to a serving cell and an adjacent cell of the serving cell, beams of the adjacent cell may be measured to provide reference in advance and guarantee for mobility of the terminal.

In at least one embodiment, the at least one beam may include beams in the serving cell of the terminal and the beams of the adjacent cell of the serving cell.

In at least one embodiment of the disclosure, the measurement result includes signal strength and/or signal quality for each beam in the at least one beam. In an alternative embodiment, the measurement result includes signal strength and/or signal quality for the beam group to which the beam belongs. In an alternative embodiment, the measurement result includes signal strength and/or signal quality for the cell containing the beam. In an alternative embodiment, the measurement result includes an ordering of the signal strength and/or signal quality of the at least one beam.

Specifically, the signal strength and/or signal quality for the beam group to which the beam belongs may be signal strength and/or signal quality of a beam with optimal signal strength for signal transmission in the beam group and/or of a beam with optimal signal quality for signal transmission in the beam group, or may be average strength (or weighted average strength) and/or average signal quality (or weighted average quality) for all beams in the beam group, and the like. The signal strength and/or signal quality for the cell containing the beam may be signal strength and/or signal quality of a beam with optimal signal strength for signal transmission in the cell and/or of a beam with optimal signal quality for signal transmission in the cell, or may be average strength (or weighted average strength) and/or average signal quality (or weighted average quality) for all beams in the cell, and the like. The ordering of the signal strength and/or signal quality of the at least one beam may be an ordering, obtained according to the signal strength and/or the signal quality, of an index of the at least one beam.

In at least one embodiment, the measurement result may include an indication of a beam group or indication of a cell with optimal beam signal strength and/or optimal beam signal quality for signal transmission in the beam groups to which the beams belong or in the cells corresponding to the beams. In an alternative embodiment, the measurement result may include average signal strength and/or average signal quality for signal transmission in the beam groups to which the beams belong or in the cells corresponding to the beams.

Specifically, the measurement result may include information obtained by comparing or calculating the signal strength and/or the signal quality. For example, when the at least one beam belongs to multiple beam groups or multiple cells, signal strength and/or signal quality for signal transmission of the multiple beam groups or the multiple cells may be calculated at first, the beam group and/or cell with optimal signal strength and/or optimal signal quality for signal transmission is selected and an indication of the beam group or an indication of the cell is determined as the measurement result.

In S330, the terminal sends the measurement result to the network device.

According to the beam measurement method of the embodiment of the disclosure, the terminal receives the measurement configuration information sent by the network device and measures the beam according to the measurement configuration information to obtain a more accurate beam-based measurement result, so that the network device performs more efficient configuration for the terminal according to the measurement result.

In at least one embodiment, after the operation in S330, the method 300 may further include the following operation. The terminal receives a determination result sent by the network device. The determination result includes at least one of a target beam, a target beam group or a target cell determined by the network device according to the measurement result. The target beam is a beam on which the terminal may camp, the target beam group is a beam group on which the terminal may camp and the target cell is a cell on which the terminal may camp. A specific process for obtaining the determination result by the network device will be described in detail in the following method 400.

The measurement mode in the embodiment of the disclosure will be introduced below in detail. Information of the measurement mode may include at least one of information of the measurement duration or information of the measurement cycle. It is to be understood that a measurement mode includes a measurement duration and a measurement cycle. Part of contents may be specified in the protocol or exchanged through the other signaling.

In at least one embodiment, when the at least one beam belongs to one or multiple cells, the measurement duration may be a duration corresponding to measurement of all beams in the one or multiple cells. The measurement duration and the measurement cycle may be determined by the network device according to a sweeping cycle of all beams in the one or multiple cells and/or a sweeping duration of all beams in the one or multiple cells.

Figure 4:
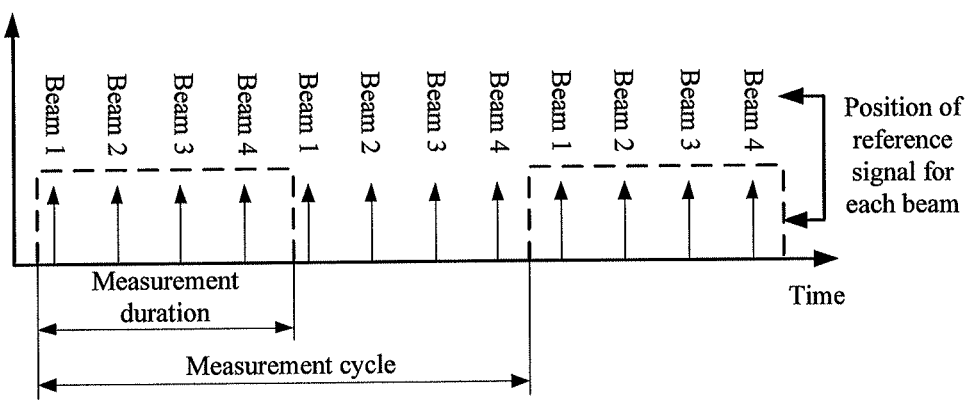
FIG. 4 is a schematic diagram of a measurement mode according to an embodiment of the disclosure.

Specifically, FIG. 4 is a schematic diagram of a measurement mode according to an embodiment of the disclosure. FIG. 4 illustrates a cell, the cell includes four beams, i.e., a beam 1, a beam 2, a beam 3 and a beam 4, and a position of a reference signal used during measurement of each beam is illustrated in the figure. The measurement duration is a duration corresponding to measurement of the four beams in the cell, and the measurement cycle is the time elapsed from start of the present measurement to start of the next measurement (or from end of the present measurement to end of the next measurement). The measurement duration and the measurement cycle both may be determined based on the sweeping cycle of any beam and/or a sweeping duration of any beam.

It is to be understood that, when the at least one beam to be measured belongs to multiple cells and positions of reference signals for the beams in the multiple cells are suitable for measurement of all the beams during a measurement (for example, the positions of the reference signals for all the beams are concentrated in a certain region), the measurement mode of the embodiment may also be adopted. There are no limits made thereto in the embodiment of the disclosure.

In at least one embodiment, when the at least one beam belongs to one or multiple cells, the measurement duration may be a duration corresponding to measurement of one beam in the one or multiple cells. The measurement duration and the measurement cycle may be determined by the network device according to the sweeping cycle of each beam in the one or multiple cells and/or the sweeping duration of each beam in the one or multiple cells.

In the embodiment of the disclosure, the terminal measures all the beams in a centralized period of time, and data or control signaling may be transmitted in other time. Therefore, the terminal is not required to be frequently switched between a measurement state and a normal working state.

Figure 5:
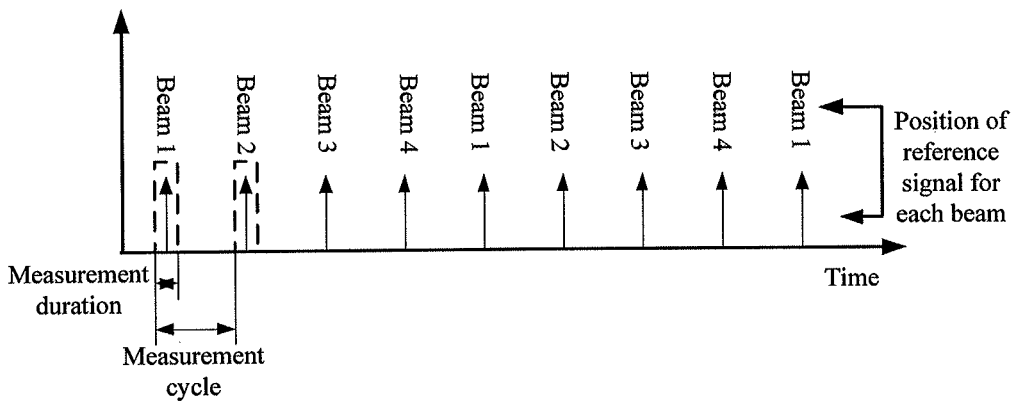
FIG. 5 is a schematic diagram of a measurement mode according to another embodiment of the disclosure.

Specifically, FIG. 5 is a schematic diagram of a measurement mode according to another embodiment of the disclosure. FIG. 5 illustrates a cell, the cell includes four beams, i.e., a beam 1, a beam 2, a beam 3 and a beam 4, and a position of a reference signal used during measurement of each beam is illustrated in the figure. The measurement duration is a duration corresponding to measurement of one beam (for example, the beam 1) in the cell, and the measurement cycle is the time elapsed from start of measurement of the present beam to start of measurement of a next beam (or from end of measurement of the present beam to end of measurement of the next beam). The measurement duration and the measurement cycle both may be determined based on the sweeping cycle of any beam and/or the sweeping duration of any beam.

It is to be understood that, when the at least one beam to be measured belongs to multiple cells and positions of reference signals for the beams in the multiple cells meet the condition that the positions of the reference signals for all the beams are uniformly distributed, the measurement mode of the embodiment may also be adopted. There are no limits made thereto in the embodiment of the disclosure.

In the embodiment of the disclosure, the terminal, after measuring a beam, switches back to the working state for transmission of the data or the control signaling. Therefore, transmission efficiency of the data or the control signaling may be improved.

In at least one embodiment, when the at least one beam includes multiple beams and the multiple beams belong to multiple cells, the measurement mode includes multiple measurement durations and/or multiple measurement cycles. The measurement durations and the measurement cycles are determined by the network device according to a sweeping cycle of each beam of each cell in the multiple cells and/or a sweeping duration of each beam of each cell in the multiple cells.

Figure 6:
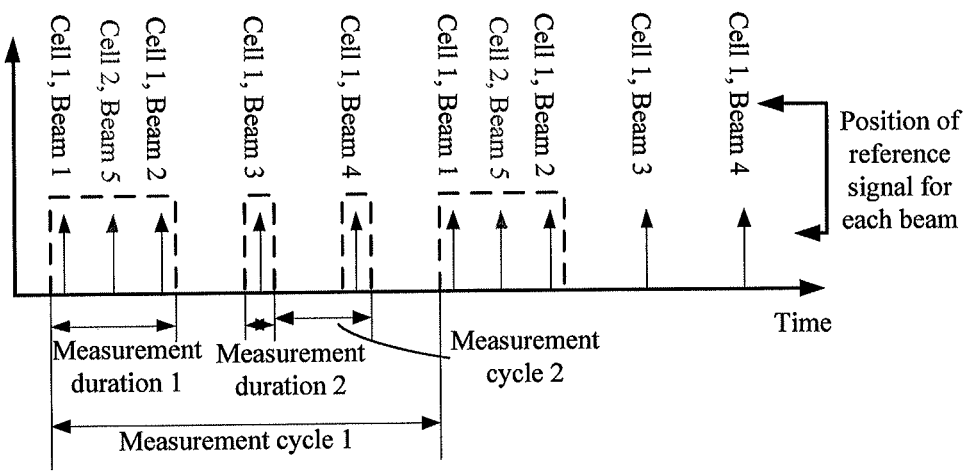
FIG. 6 is a schematic diagram of a measurement mode according to another embodiment of the disclosure.

Specifically, FIG. 6 is a schematic diagram of a measurement mode according to another embodiment of the disclosure. FIG. 6 illustrates two cells, the cell 1 includes four beams, i.e., a beam 1, a beam 2, a beam 3 and a beam 4, and the cell 2 includes a beam 5. The position of a reference signal used during measurement of each beam is illustrated in FIG. 6. There are two measurement durations. The measurement duration 1 is a duration corresponding to measurement of two beams (the beam 1 and the beam 2) in the cell 1 and the beam 5 in the cell 2, and the measurement duration 2 is a duration corresponding to measurement of the beam 3 or beam 4 in the cell 1. There may also be two measurement cycles. The measurement cycle 1 is a cycle corresponding to the measurement duration 1 and the measurement cycle 2 is a cycle corresponding to the measurement duration 2. The measurement durations and the measurement cycles may be determined by the network device according to the sweeping cycle of each beam of each cell in the multiple cells and/or the sweeping duration of each beam of each cell in the multiple cells.

It is to be understood that the measurement durations and the measurement cycles may be flexibly determined according to the positions of the reference signals for the beams in the multiple cells. There are no limits made thereto in the embodiment of the disclosure.

In at least one embodiment, the method 300 may further include the following operations. The terminal reports a measurement mode recommended after beam measurement to the network device. The terminal receives an updating configuration sent by the network device, and the updating configuration is configured to instruct the terminal to use an updated measurement mode for beam measurement.

Specifically, the network device configures the measurement duration and/or the measurement cycle for the terminal according to a condition of the beam in each cell, the terminal performs beam measurement according to the corresponding measurement mode (for example, a measurement mode 1). The terminal, when measuring that different beam sending modes are adopted for the multiple cells, may recommend the new measurement mode (for example, a measurement mode 3) to the serving network device through a feedback mechanism, and the network device may configure a better measurement mode for the terminal, so that the terminal may adopt the better measurement mode for measurement.

The beam measurement method of the embodiments of the disclosure is described above in combination with FIG. 3 to FIG. 6 from the perspective of the terminal in detail. The beam measurement method of the embodiments of the disclosure will be described below in combination with FIG. 7 from the perspective of the network device in detail.

Figure 7:
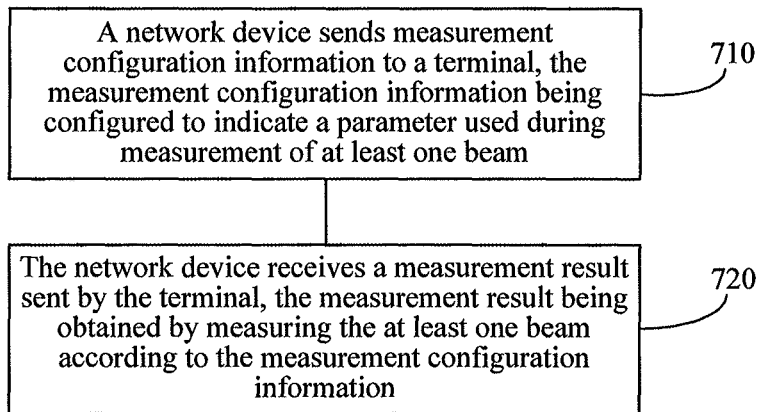
FIG. 7 is a schematic flowchart of a beam measurement method according to another embodiment of the disclosure.

FIG. 7 is a schematic flowchart of a beam measurement method 700 according to another embodiment of the disclosure. The method 700 is executed by a network device and may include the following operations.

In S710, the network device sends measurement configuration information to a terminal, the measurement configuration information being configured to indicate a parameter used during measurement of at least one beam.

In S720, the network device receives a measurement result sent by the terminal, and the measurement result is obtained by measuring the at least one beam according to the measurement configuration information.

According to the beam measurement method of the embodiment of the disclosure, the network device sends the measurement configuration information to the terminal and then the terminal may measure the beam according to the measurement configuration information to obtain a more accurate beam-based measurement result, so that the network device performs more efficient configuration for the terminal according to the measurement result.

In at least one embodiment, the method 700 may further include the following operations. The network device determines at least one of a target beam, a target beam group or a target cell according to the measurement result. The target beam is a beam on which the terminal may camp, the target beam group is a beam group on which the terminal may camp and the target cell is a cell on which the terminal may camp. The network device sends a determination result to the terminal, and the determination result includes at least one of the target beam, the target beam group or the target cell.

Specifically, the network device may determine a beam with optimal signal strength and/or optimal signal quality for signal transmission in the at least one beam according to signal strength and/or signal quality for each of the at least one beam in the measurement result and determine the beam with the optimal signal strength and/or optimal signal quality for signal transmission as the target beam. In one alternative example, the network device determines the beam with signal strength and/or signal quality higher than a signal strength threshold and/or a signal quality threshold as the target beam. In one alternative example, the network device determines a group of beams with signal strength and/or signal quality higher than a signal strength threshold and/or a signal quality threshold as the target beam group. In one alternative example, the network device determines a cell, which has most beams with signal strength and/or signal quality higher than the signal strength threshold and/or the signal quality threshold, in multiple cells as the target cell, and the like.

It is to be understood that the signal strength threshold and/or the signal quality threshold may be predefined, may also be input by a network manager through a network interface and may also be specified in another manner. There are no limits made thereto in the embodiment of the disclosure.

In at least one embodiment, the network device may determine a cell set or a beam set according to the signal strength and/or signal quality for the at least one beam in the measurement result and then determine the target cell from the cell set according to cell priorities or determine the target beam and/or the target beam group from the beam set according to beam priorities.

In at least one embodiment, the network device may determine the target beam group according to the signal strength and/or signal quality for beam groups in the measurement result. In at least one embodiment, the network device may determine the target cell according to the signal strength and/or signal quality for cells in the measurement result.

In at least one embodiment, the network device may determine one or multiple beams as (a) target beam(s) according to an ordering of the signal strength and/or signal quality of the at least one beam in the measurement result. When multiple beams are determined, the multiple beams may form a beam group. In an alternative embodiment, one or multiple cells with relatively high signal strength and/or signal quality are selected as target cells according to an ordering of the signal strength and/or signal quality of the beams.

The operation that the network device determines at least one of the target beam, the target beam group or the target cell according to the measurement result may be performed in various manners. There are no limits made thereto in the embodiment of the disclosure.

It is to be understood that the determination regarding whether the target beam, the target beam group or the target cell is determined according to a requirement. Moreover, in a specific example, determination of the target cell (for example, the target cell includes two beam groups and the two beam groups include totally five beams) is equivalent to simultaneous determination of two target beams and five target beams.

In at least one embodiment, the at least one beam may belong to the same cell. In at least one embodiment, the at least one beam may be multiple beams and the multiple beams belong to multiple cells.

In at least one embodiment, the measurement configuration information may include at least one of an indication of the beam, an indication of a beam group to which the beam belongs, an indication of a cell corresponding to the beam, an indication of an AP corresponding to the beam, an indication of a base station corresponding to the beam, a measurement frequency, a measurement cycle, a measurement duration, a measurement mode, a beam resource related parameter or information of a reference signal corresponding to the beam.

In at least one embodiment, the method 700 may further include the following operations. The network device receives a measurement mode recommended after beam measurement and reported by the terminal. The network device sends an updating configuration to the terminal, and the updating configuration is configured to instruct the terminal to use an updated measurement mode for beam measurement.

In at least one embodiment, the measurement configuration information may include information of the measurement mode. The information of the measurement mode includes information of the measurement duration and/or information of the measurement cycle. The at least one beam belongs to one or multiple cells, the measurement duration is a duration corresponding to measurement of all beams in the one or multiple cells, and the measurement duration and the measurement cycle are determined by the network device according to a sweeping cycle of all beams in the one or multiple cells and/or a sweeping duration of all beams in the one or multiple cells. In an alternative embodiment, the at least one beam belongs to one or multiple cells, the measurement duration is a duration corresponding to measurement of one beam in the one or multiple cells, and the measurement duration and the measurement cycle are determined by the network device according to the sweeping cycle of each beam in the one or multiple cells and/or the sweeping duration of each beam in the one or multiple cells. In an alternative embodiment, the at least one beam includes multiple beams, the multiple beams belong to multiple cells. The measurement mode includes multiple measurement durations and/or multiple measurement cycles, and the measurement durations and the measurement cycles are determined by the network device according to a sweeping cycle of each beam of each cell in the multiple cells and/or a sweeping duration of each beam of each cell in the multiple cells.

In at least one embodiment, the measurement result may include signal strength and/or signal quality for each beam in the at least one beam. In an alternative embodiment, the measurement result may include signal strength and/or signal quality for the beam group to which the beam belongs. In an alternative embodiment, the measurement result may include signal strength and/or signal quality for the cell containing the beam. In an alternative embodiment, the measurement result may include an ordering of the signal strength and/or signal quality of the at least one beam.

In at least one embodiment, the measurement result may include an indication of a beam group or indication of a cell with optimal signal strength and/or optimal signal quality for signal transmission in the beam groups to which the beams belong or in the cells corresponding to the beams. In an alternative embodiment, the measurement result may include average signal strength and/or average signal quality for signal transmission in the beam groups to which the beams belong or in the cells corresponding to the beams.

The beam measurement method of the embodiments of the disclosure is described above in combination with FIG. 1 to FIG. 7 in detail. A terminal and a network device of the embodiments of the disclosure will be described below in combination with FIG. 8 to FIG. 11 in detail.

Figure 8:
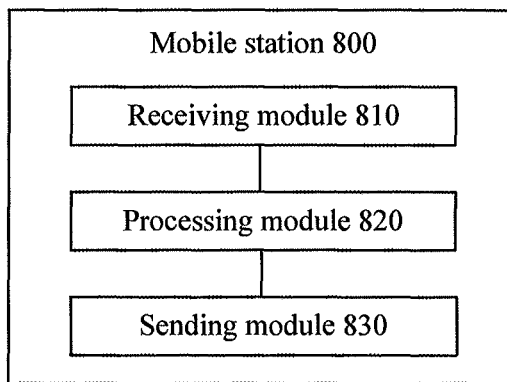
FIG. 8 is a schematic block diagram of a terminal according to an embodiment of the disclosure.

FIG. 8 is a schematic block diagram of a terminal according to an embodiment of the disclosure. The terminal 800 illustrated in FIG. 8 includes a receiving module 810, a processing module 820 and a sending module 830.

The receiving module 810 is configured to receive measurement configuration information sent by a network device, and the measurement configuration information is configured to indicate a parameter used during measurement of at least one beam.

The processing module 820 is configured to perform measurement of the at least one beam to obtain a measurement result according to the measurement configuration information received by the receiving module 810.

The sending module 830 is configured to send the measurement result obtained by the processing module 820 to the network device.

According to the embodiment of the disclosure, the terminal receives the measurement configuration information sent by the network device and measures the beams according to the measurement configuration information to obtain a more accurate beam-based measurement result, so that the network device performs more efficient configuration for the terminal according to the measurement result.

In at least one embodiment, the receiving module 810 may further be configured to receive a determination result sent by the network device, and the determination result includes at least one of a target beam, a target beam group or a target cell determined by the network device according to the measurement result. The target beam is a beam where the terminal may camp on, the target beam group is a beam group where the terminal may camp on and the target cell is a cell where the terminal may camp on.

In at least one embodiment, the at least one beam may belong to the same cell. In at least one embodiment, the at least one beam may be multiple beams and the multiple beams may belong to multiple cells.

In at least one embodiment, the measurement configuration information may include at least one of an indication of the beam, an indication of a beam group to which the beam belongs, an indication of a cell corresponding to the beam, an indication of an AP corresponding to the beam, an indication of a base station corresponding to the beam, a measurement frequency, a measurement cycle, a measurement duration, a measurement mode, a beam resource related parameter or information of a reference signal corresponding to the beam.

In at least one embodiment, the sending module 830 may further be configured to report a measurement mode recommended after beam measurement to the network device. The receiving module 810 may further be configured to receive an updating configuration sent by the network device, and the updating configuration may be configured to instruct the terminal to use an updated measurement mode for beam measurement.

In at least one embodiment, the measurement configuration information may include information of the measurement mode, and the information of the measurement mode includes information of the measurement duration and/or information of the measurement cycle. The at least one beam belongs to one or multiple cells, the measurement duration may be a duration corresponding to measurement of all beams in the one or multiple cells, and the measurement duration and the measurement cycle are determined by the network device according to a sweeping cycle of all beams in the one or multiple cells and/or a sweeping duration of all beams in the one or multiple cells. In an alternative embodiment, the at least one beam belongs to one or multiple cells, the measurement duration may be a duration corresponding to measurement of one beam in the one or multiple cells, and the measurement duration and the measurement cycle are determined by the network device according to the sweeping cycle of each beam in the one or multiple cells and/or the sweeping duration of each beam in the one or multiple cells. In an alternative embodiment, the at least one beam includes multiple beams, the multiple beams may belong to multiple cells. The measurement mode includes multiple measurement durations and/or multiple measurement cycles, and the measurement durations and the measurement cycles are determined by the network device according to a sweeping cycle of each beam of each cell in the multiple cells and/or a sweeping duration of each beam of each cell in the multiple cells.

In at least one embodiment, the measurement result may include signal strength and/or signal quality for each beam in the at least one beam. In an alternative embodiment, the measurement result may include signal strength and/or signal quality for the beam group to which the beam belongs. In an alternative embodiment, the measurement result may include signal strength and/or signal quality for the cell containing the beam. In an alternative embodiment, the measurement result may include an ordering of the signal strength and/or signal quality of the at least one beam.

In at least one embodiment, the measurement result may include an indication of the beam group or indication of the cell with optimal signal strength and/or optimal signal quality for signal transmission in the beam groups to which the beams belong or in the cells corresponding to the beams. In at least one embodiment, the measurement result may include average signal strength and/or average signal quality for signal transmission in the beam groups to which the beams belong or in the cells corresponding to the beams.

Figure 9:
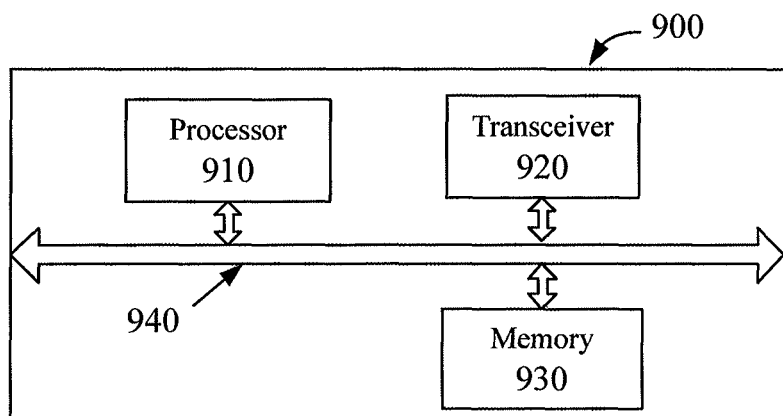
FIG. 9 is a schematic block diagram of a terminal according to another embodiment of the disclosure.

It is to be noted that in the embodiment of the disclosure, the receiving module 810 and the sending module 830 may be implemented by a transceiver and the processing module 820 may be implemented by a processor. As illustrated in FIG. 9, a terminal 900 may include a processor 910, a transceiver 920 and a memory 930. The memory 930 may be configured to store a code executed by the processor 910 and the like.

Components in the terminal 900 are coupled together through a bus system 940. The bus system 940 includes a data bus, and further includes a power bus, a control bus and a state signal bus.

The terminal 900 illustrated in FIG. 9 or the terminal 800 illustrated in FIG. 8 may implement each process implemented in the embodiments of FIG. 1 to FIG. 7. No more elaborations will be made herein to avoid repetitions.

It is to be noted that the method embodiment of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or electrically erasable programmable memory and a register. The storage medium is located in a memory. The processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 10:
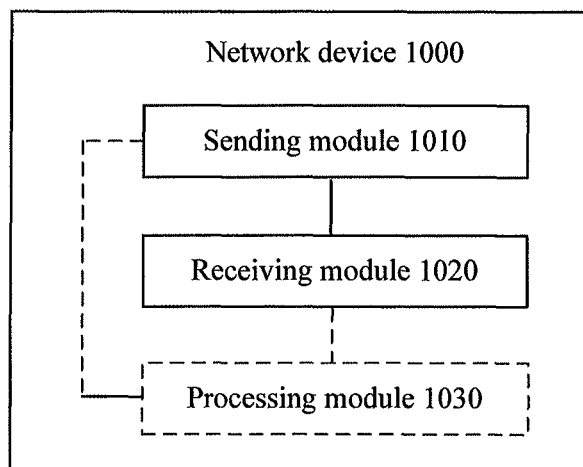
FIG. 10 is a schematic block diagram of a network device according to an embodiment of the disclosure.

FIG. 10 is a schematic block diagram of a network device according to an embodiment of the disclosure. The network device 1000 illustrated in FIG. 10 includes a sending module 1010 and a receiving module 1020.

The sending module 1010 is configured to send measurement configuration information to a terminal, and the measurement configuration information is configured to indicate a parameter used during measurement of at least one beam.

The receiving module 1020 is configured to receive a measurement result sent by the terminal, and the measurement result is obtained by measuring the at least one beam according to the measurement configuration information sent by the sending module 1010.

According to the embodiment of the disclosure, the network device sends the measurement configuration information to the terminal and then the terminal may measure the beam according to the measurement configuration information to obtain a more accurate beam-based measurement result, so that the network device performs more efficient configuration for the terminal according to the measurement result.

In at least one embodiment, the network device may further include a processing module 1030, configured to determine at least one of a target beam, a target beam group or a target cell according to the measurement result received by the receiving module 1020. The target beam is a beam where the terminal may camp on, the target beam group is a beam group where the terminal may camp on and the target cell is a cell where the terminal may camp on. The sending module 1010 may further be configured to send a determination result to the terminal, and the determination result includes at least one of the target beam, the target beam group or the target cell obtained by the processing module 1030.

In at least one embodiment, the at least one beam may belong to the same cell. In at least one embodiment, the at least one beam may include multiple beams and the multiple beams may belong to multiple cells.

In at least one embodiment, the measurement configuration information may include at least one of an indication of the beam, an indication of a beam group to which the beam belongs, an indication of a cell corresponding to the beam, an indication of an AP corresponding to the beam, an indication of a base station corresponding to the beam, a measurement frequency, a measurement cycle, a measurement duration, a measurement mode, a beam resource related parameter or information of a reference signal corresponding to the beam.

In at least one embodiment, the receiving module 1020 may further be configured to receive a measurement mode recommended after beam measurement and reported by the terminal. The sending module 1010 may further be configured to send an updating configuration to the terminal, and the updating configuration is configured to instruct the terminal to use an updated measurement mode for beam measurement.

In at least one embodiment, the measurement configuration information may include information of the measurement mode, and the information of the measurement mode includes information of the measurement duration and/or information of the measurement cycle. The at least one beam belongs to one or multiple cells, the measurement duration may be a duration corresponding to measurement of all beams in the one or multiple cells, and the measurement duration and the measurement cycle are determined by the network device according to a sweeping cycle of all beams in the one or multiple cells and/or a sweeping duration of all beams in the one or multiple cells. In an alternative embodiment, the at least one beam belongs to one or multiple cells, the measurement duration may be a duration corresponding to measurement of one beam in the one or multiple cells, and the measurement duration and the measurement cycle are determined by the network device according to the sweeping cycle of each beam in the one or multiple cells and/or the sweeping duration of each beam in the one or multiple cells. In an alternative embodiment, the at least one beam may include multiple beams, and the multiple beams may belong to multiple cells. The measurement mode includes multiple measurement durations and/or multiple measurement cycles, and the measurement durations and the measurement cycles are determined by the network device according to a sweeping cycle of each beam of each cell in the multiple cells and/or a sweeping duration of each beam of each cell in the multiple cells.

In at least one embodiment, the measurement result may include signal strength and/or signal quality for each beam in the at least one beam. In an alternative embodiment, the measurement result may include signal strength and/or signal quality for the beam group to which the beam belongs. In an alternative embodiment, the measurement result may include signal strength and/or signal quality for the cell containing the beam. In an alternative embodiment, the measurement result may include an ordering of the signal strength and/or signal quality of the at least one beam.

In at least one embodiment, the measurement result may include an indication of a beam group or indication of a cell with optimal signal strength and/or optimal signal quality for signal transmission in the beam groups to which the beams belong or in the cells corresponding to the beams. In an alternative embodiment, the measurement result may include average signal strength and/or average signal quality for signal transmission in the beam groups to which the beam belong or in the cells corresponding to the beams.

Figure 11:
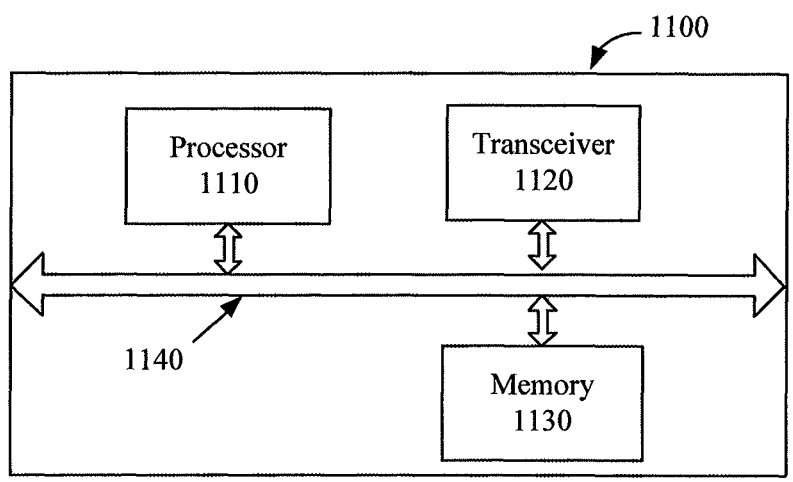
FIG. 11 is a schematic block diagram of a network device according to another embodiment of the disclosure.

It is to be noted that in the embodiment of the disclosure, the sending module 1010 and the receiving module 1020 may be implemented by a transceiver and the processing module 1030 may be implemented by a processor. As illustrated in FIG. 11, a network device 1100 may include a processor 1110, a transceiver 1120 and a memory 1130. The memory 1130 may be configured to store a code executed by the processor 1110 and the like.

Components in the network device 1100 are coupled together through a bus system 1140. The bus system 1140 includes a data bus, and further includes a power bus, a control bus and a state signal bus.

The network device 1100 illustrated in FIG. 11 or the network device 1000 illustrated in FIG. 10 may implement each process implemented in the embodiments of FIG. 1 to FIG. 7. No more elaborations will be made herein to avoid repetitions.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" at any place of the whole specification does not always refer to the same embodiment. In addition, these specific features, structures or characteristics may be combined in one or more embodiments in any proper manner.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

It is to be understood that in the embodiments of the disclosure, "B corresponding to A" represents that B is associated with A and B may be determined according to A. It is also to be understood that determining B according to A does not mean that B is determined only according to A and B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A beam measurement method, comprising:
   receiving, by a terminal, measurement configuration information sent by a network device, the measurement configuration information being configured to indicate a parameter used during measurement of at least one beam and comprising information of a measurement mode, and the information of the measurement mode comprises at least one of information of a measurement duration or information of a measurement cycle, wherein the at least one beam comprises multiple beams, the multiple beams belong to multiple cells, the measurement mode comprises at least one of multiple measurement durations or multiple measurement cycles, and the measurement durations and the measurement cycles are determined by the network device according to at least one of a sweeping cycle of one or multiple beams of each cell in the multiple cells or a sweeping duration of one or multiple beams of each cell in the multiple cells;
   performing, by the terminal, measurement of the at least one beam to obtain a measurement result according to the measurement configuration information; and
   sending, by the terminal, the measurement result to the network device.

2. The method of claim 1, further comprising:
   receiving, by the terminal, a determination result from the network device, the determination result comprising at least one of a target beam, a target beam group or a target cell determined by the network device, the target beam being a beam on which the terminal is capable of camping, the target beam group being a beam group on which the terminal is capable of camping and the target cell being a cell on which the terminal is capable of camping.

3. The method of claim 1, wherein the at least one beam belongs to a same cell.

4. The method of claim 1, wherein the measurement configuration information comprises at least one of an indication of the beam, an indication of a beam group to which the beam belongs, an indication of a cell corresponding to the beam, an indication of an Access Point (AP) corresponding to the beam, an indication of a base station corresponding to the beam, a measurement frequency, a beam resource related parameter or information of a reference signal corresponding to the beam.

5. The method of claim 1, further comprising:
   reporting, by the terminal to the network device, a measurement mode recommended after beam measurement; and
   receiving, by the terminal, an updating configuration sent by the network device, the updating configuration being configured to instruct the terminal to use an updated measurement mode for beam measurement.

6. The method of claim 1, wherein the measurement result comprises at least one of signal strength or signal quality for each of the at least one beam; or
   the measurement result comprises at least one of signal strength or signal quality for the beam group to which the beam belongs; or
   the measurement result comprises at least one of signal strength or signal quality for the cell containing the beam; or
   the measurement result comprises an ordering of at least one of signal strength of the at least one beam or signal quality of the at least one beam.

7. The method of claim 1, wherein the measurement result comprises an indication of a beam group or an indication of a cell with at least one of optimal signal strength or optimal signal quality for signal transmission in one beam or in beam groups to which the beams belong or in cells corresponding to the beams; or
   the measurement result comprises at least one of average signal strength or average signal quality for signal transmission in the beam groups to which the beams belong or in the cells corresponding to the beams.

8. A terminal, comprising:
   a transceiver, configured to receive measurement configuration information sent by a network device, the measurement configuration information being configured to indicate a parameter used during measurement of at least one beam and comprising information of a measurement mode, and the information of the measurement mode comprises at least one of information of a measurement duration or information of a measurement cycle, wherein the at least one beam comprises multiple beams, the multiple beams belong to multiple cells, the measurement mode comprises at least one of multiple measurement durations or multiple measurement cycles, and the measurement durations and the measurement cycles are determined by the network device according to at least one of a sweeping cycle of one or multiple beams of each cell in the multiple cells or a sweeping duration of one or multiple beams of each cell in the multiple cells;
   a processor, configured to perform measurement of the at least one beam to obtain a measurement result according to the measurement configuration information received by the transceiver; and
   wherein the transceiver is further configured to send the measurement result obtained by the processor to the network device.

9. The terminal of claim 8, wherein the transceiver is further configured to:
   receive a determination result from the network device, the determination result comprising at least one of a target beam, a target beam group or a target cell determined by the network device, the target beam being a beam on which the terminal is capable of camping, the target beam group being a beam group on which the terminal is capable of camping and the target cell being a cell on which the terminal is capable of camping.

10. The terminal of claim 9, wherein the transceiver is further configured to:
    report a measurement mode recommended after beam measurement to the network device; and
    receive an updating configuration sent by the network device, the updating configuration being configured to instruct the terminal to use an updated measurement mode for beam measurement.

11. The terminal of claim 8, wherein the at least one beam belongs to a same cell.

12. The terminal of claim 8, wherein the measurement configuration information comprises at least one of an indication of the beam, an indication of a beam group to which the beam belongs, an indication of a cell corresponding to the beam, an indication of an Access Point (AP) corresponding to the beam, an indication of a base station corresponding to the beam, a measurement frequency, a beam resource related parameter or information of a reference signal corresponding to the beam.

13. The terminal of claim 8, wherein the transceiver is further configured to:
report a measurement mode recommended after beam measurement to the network device; and
receive an updating configuration sent by the network device, the updating configuration being configured to instruct the terminal to use an updated measurement mode for beam measurement.

14. The terminal of claim 8, wherein the measurement result comprises least one of signal strength or signal quality for each of the at least one beam; or
the measurement result comprises at least one of signal strength or signal quality for the beam group to which the beam belongs; or
the measurement result comprises at least one of signal strength or signal quality for the cell containing the beam; or
the measurement result comprises an ordering of at least one of signal strength or signal quality of the at least one beam.

15. The terminal of claim 8, wherein the measurement result comprises an indication of a beam group or an indication of a cell with at least one of optimal signal strength or optimal signal quality for signal transmission in one beam or in beam groups to which the beams belong or in cells corresponding to the beams; or
the measurement result comprises at least one of average signal strength or average signal quality for signal transmission in the beam groups to which the beams belong or in the cells corresponding to the beams.

16. A non-transitory computer-readable storage medium, comprising a computer-executable instruction that, when executed by a processor, causes the processor to execute a beam measurement method, the method comprising:
receiving measurement configuration information sent by a network device, the measurement configuration information being configured to indicate a parameter used during measurement of at least one beam and comprising information of a measurement mode, and the information of the measurement mode comprises at least one of information of a measurement duration or information of a measurement cycle, wherein the at least one beam comprises multiple beams, the multiple beams belong to multiple cells, the measurement mode comprises at least one of multiple measurement durations or multiple measurement cycles, and the measurement durations and the measurement cycles are determined by the network device according to at least one of a sweeping cycle of one or multiple beams of each cell in the multiple cells or a sweeping duration of one or multiple beams of each cell in the multiple cells;
performing measurement of the at least one beam to obtain a measurement result according to the measurement configuration information; and
sending the measurement result to the network device.

* * * * *